3,488,403
2,5-DIMETHYLHEXENE PRODUCTION FROM ISOBUTYLENE
Raymond A. Franz, Kirkwood, and Ronald O. Downs, St. Louis, Mo., assignors to Monsanto Company, St. Louis, Mo., a corporation of Delaware
No Drawing. Filed May 23, 1966, Ser. No. 551,941
Int. Cl. C07c 3/08
U.S. Cl. 260—683.1                    5 Claims

ABSTRACT OF THE DISCLOSURE 2,5-dimethylhexene is produced by a thermal non-catalytic process wherein isobutylene is contacted with hydrogen sulfide under the reaction conditions. By carrying out this process, the conversion of isobutylene and yield of a 2,5-dimethylhexene are increased.

---

The present invention relates to a process for the selective conversion of hydrocarbons. More particularly, the present invention relates to a process for the conversion of isobutylene to 2,5-dimethylhexene.

Literally hundreds of processes are known for the polymerization of isobutylene. The majority of these processes provide means whereby isobutylene may be polymerized to high molecular weight oils or even higher molecular weight solid polymers. A few of these polymerization processes provide means whereby isobutylene is polymerized to low molecular weight polymer such as dimers, trimers, and tetramers. However, few if any of these processes provide a means whereby isobutylene may be selectively polymerized in high yields and with good conversions to a single specific dimeric compounds.

It is well known in the art that 2,5-dimethylhexenes may be dehydrocyclized to p-xylene. Usually, however, it is rather difficult to obtain the 2,5-dimethylhexenes in a relatively pure form for such conversion reaction.

It is an object of the present invention to provide a new and novel process for the selective conversion of hydrocarbons. Another object of the present invention is to provide a new and novel process whereby isobutylene may be selectively polymerized to 2,5-dimethylhexene. Still another object of the present invention is to provide a new and novel process for the production of 2,5-dimethylhexene by the thermal dimerization of isobutylene whereby the 2,5-dimethylhexene is obtained in good yields and in high concentrations. Additional objects will become apparent from the following description of the invention herein disclosed.

The present invention which accomplishes these and other objects is a process for the preparation of 2,5-dimethylhexene which process comprises subjecting isobutylene in a reaction zone to a temperature of 350 to 600° C. and a pressure of at least 200 p.s.i.g. for a period of 0.005 to 60 minutes in the presence of at least one modifying agent selected from the group consisting of (1) $H_2S$, HBr, HCl, HI, and combinations thereof, and (2) compounds and elements which under the conditions of the reaction zone will form $H_2S$, HBr, HCl, HI, and combinations thereof. The process of the present invention provides a means whereby isobutylene may be converted to 2,5-dimethylhexenes in good yields. Further, the 2,5-dimethylhexenes are produced by the process of the present invention with high selectivity, there being few by-product dimers of the isobutylene produced.

In order to further describe as well as to demonstrate the present invention, the following examples are presented. These examples are not to be construed as limiting the present invention.

EXAMPLE I

Isobutylene was passed at a rate of 0.16 mole per minute concurrently with $H_2S$ through a stainless steel reaction tube. The amount of $H_2S$ was 5 mole percent of the isobutylene-$H_2S$ mixture. Temperature within the reaction tube was 410° C. and the pressure was 300 p.s.i.g. The residence time of the reactants within the reaction tube was 60 seconds. Collection and analysis of the reaction product demonstrated a conversion of 39.7% by weight and a 2,5-dimethylhexene yield of 54.0% by weight.

EXAMPLE II

Example I was substantially repeated except that the temperature was 450° C., the pressure was 1000 p.s.i.g. and the amount of $H_2S$ was 1.5 mole percent of the isobutylene-$H_2S$ mixture. The conversion was found to be 18.4% by weight and the 2,5-dimethylhexene yield was found to be 46.2% by weight.

EXAMPLE III

Two separate runs were conducted under substantially the same reaction conditions. Each run was carried out by isobutylene in a ½ inch outside diameter stainless steel tube having an internal volume of 22 ml. In one of the runs, hereinafter designated Run A, 2.6 grams of isobutylene was placed in the tube, while in the other run, hereinafter designated Run B, 2.21 grams of isobutylene and 0.02 grams of benzenethiol were placed in the tube. The tube was sealed in each run after introduction of the reactants and heated to a temperature of 400° C. at which temperature it was maintained for 30 minutes. Pressure was not measured in either run, but is readily calculated from the temperature and quantity of products in the steel tube. The following table presents the results of the two runs.

| Run: | Conversion | Yield of 2,5-dimethyl-hexenes |
|---|---|---|
| A | 27.7 | 10.6 |
| B | 69.2 | 24.3 |

Run B in which the modifying agent benzenethiol was used resulted in an approximately 250% increase in conversion and a 229% increase in yield of 2,5-dimethylhexenes.

The modifying agents useful in the process of the present invention comprise (1) $H_2S$, HBr, HCl, HI, and combinations thereof, or (2) compounds and elements which under the conditions of the reaction zone will form $H_2S$, HBr, HCl, HI, and combinations thereof. Within group (1), HBr is usually preferred over the other hydrogen halides. However, of group (1), $H_2S$ is preferred over the hydrogen halides.

The compounds or elements which will decompose or otherwise form $H_2S$, HBr, HCl, HI, or combinations thereof under the conditions of the reaction zone broadly include virtually any compound or element which, as defined, will form these materials under such conditions. Included within this group are elemental sulfur, chlorine, bromine, iodine. as well as chemical compounds of which sulfur, bromine, chlorine, and iodine are a part. The compounds which contain chlorine, bromine, iodine or sulfur may be either organic or inorganic compounds and may contain in addition to these elements such other elements as carbon, hydrogen, oxygen or nitrogen. If the compound is an organic compound, it may be saturated or unsaturated, aliphatic or aromatic, straight-chain, branched-chain or cyclic in structure. Among the halogen-containing compounds within the scope of the present invention are the following non-limiting examples:

| Column I | Column II | Column III |
|---|---|---|
| 2-bromopropane | Bromobenzene | Chloroethanoic acid. |
| 2-chloropropane | Chlorobenzene | dibromoethanoic acid. |
| 1-iodopropane | m-Dichlorobenzene | di-iodoethanoic acid. |
| 1-bromobutane | o-Dichlorobenzene | a-chloroacetamide. |
| 1-chlorobutane | p-Dichlorobenzene | a-bromoacetanilide. |
| 2-iodobutane | m-Dibromobenzene | benzoyl chloride. |
| 1-bromopentane | o-Dibromobenzene | benzoyl bromide. |
| 2-bromopentane | p-Dibromobenzene | benzoyl iodide. |
| 3-chloropentane | Iodobenzene | butanoyl chloride. |
| 2-iodopentane | o-Iodotoluene | butanoly bromide. |
| 3-bromohexane | m-Iodotoluene | butanoyl iodide. |
| 2-bromohexane | p-Iodotoluene | 2-chloro-1,4-benzenediol. |
| 2-iodohexane | o-Chlorotoluene | 2-bromo-1,4-benzenediol. |
| 2-bromo-4-methyl-hexane | m-Chlorotoluene | 1-chloro-4-nitro-naphthalene. |
| 3-chloroheptane | p-Chlorotoluene | Ethylene chlorobromide. |
| 3-bromoheptane | o-Bromotoluene | Diphenoyl chloride. |
| 2-iodoheptane | m-Bromotoluene | Succinyl chloride. |
| 3-bromo-4-ethylhexane | p-Bromotoluene | 4-chloroquinoline. |
| 4-bromo-octane | 3,5-dibromotoluene | Ethanoyl iodide. |
| 3-chloro-octane | o-Bromo-chlorobenzene | Hexanoyl chloride. |
| 2-iodo-octane | m-bromo-chlorobenzene | Decanoyl chloride. |
| 1-bromononane | p-bromo-chlorobenzene | 2-bromoethanol. |
| 2-chlorodecane | 2-bromonaphthalene | 2-chloroethanol. |
| 2-bromodecane | 1-chloronaphthalene | bis-b-Chloroethylether. |
| 2-bromo-6-methyldecane | 1,3-dichloronaphthalene | Chloromethoxymethane. |
| 4-iodoundecane | 2-chlorodiphenyl | Cyclohexylbromide. |
| 1-bromododecane | 4-chlorodiphenyl | Carbon tetrachloride. |
| 3-bromo-4-octane | 2-bromo-2-pentene | 2-chloro-3-hexane. |

The halogen-containing compounds most useful in the practice of the present invention are those which contain a halogen from the group consisting of bromine, chlorine and iodine and the elements carbon and/or hydrogen. These compounds are the halogen-substituted hydrocarbons. There is no critical limit to the molecular weight of the modifying compound other than one of practicality in handling. It will generally be somewhat preferred, from a purely practical standpoint, to use those compounds which are normally liquid, but those that are normally gaseous are even more preferred. In the practice of the present invention, the prefered halogen compounds are the mono- and di-halogen substituted hydrocarbons of no more than 6 carbon atoms and, as indicated above, the hydrogen halides. Though all of the halogens from the the group consisting of bromine, chlorine and iodine are operable in the present invention, it is generally preferred to use those compounds containing chlorine and bromine with bromine being preferred over chlorine.

Among the sulfur-bearing compounds useful in the present invention are the following non-limiting examples:

allyl sulfide
benzyl disulfide
2-methyl-1-butanethiol
2-methyl-2-butanethiol
butyl disulfide
1,2-ethanedithiol
ethylene sulfide
ethyl sulfide
1-heptanethiol
isoamyl disulfide
isobutyl sulfide
methyl sulfide
1-naphthalenethiol
phenyl disulfide
2-methyl-1-propanethiol
2,2'-thiodiethanol
acetyl disulfide
o-bromo-benzene-sulfonic acid
p-chloro-benzene-sulfonic acid
methyl-benzene-sulfonic acid
2,2'-bithiophene
butyl sulfone
dithio-carbamic acid
thiono-carbamic acid
dithiol-carbonic acid
benzoyl disulfide
benzyl sulfide
3-methyl-1-butanethiol
tert-octanethiol
butylsulfide
ethanethiol
ethyl disulfide
furfuryl mercaptan
1-hexanethiol
isoamyl sulfide
methyl disulfide
2-naphthalenethiol
1-pentanethiol
1-propanethiol
2-propanethiol
thiophene
benzenesulfonic acid
p-bromo-benzene-sulfonic acid
o-formyl-benzene-sulfonic acid
benzyl sulfoxide
butyl sulfate
butyl sulfoxide
thiol-carbamic acid
trithio-carbonic acid
cetyl sulfate
1,2-ethanedisulfonic acid
dodecyl sulfate
ethionic anhydride
ethyl sulfone
ethyl sulfuric acid
methyl sulfoxide
2-bromothiophene
2,5-dimetylthiophene
2,3-dimethylthiophene
1-decanol sulfate
methyl sulfite
bis-(b-dichloroethyl) sulfide
tetradecyl sulfate
thionaphthenequinone
3-methylthiophene
sulfur dissolved in dialkyl-alkanolamine
ethyl sulfite
ethyl sulfoxide
methanethiol
b,b'-dichloroethyl sulfide
2-chlorothiophene
2,5-diiodothiophene
vinyl sulfide
methyl sulfate
dichlorophenylphosphine sulfide
ethyl methyl sulfide
thionaphthene
2-methylthiophene
a-toluenethiol As noted from the above list of compounds, the sulfur-bearing modifying agents may contain such elements other than sulfur as carbon, hydrogen, oxygen, nitrogen, chlorine, bromine, iodine, and the like. Among the preferred compounds which form $H_2S$ in the reaction zone are such sulfur-bearing compounds as mercaptans or thiols both aliphatic and aromatic, thio ethers and thiourea. Also within this list of preferred compounds are those derived from dissolving sulfur in tertiary amines at elevated temperatures. The preferred sulfur-bearing compounds are those containing only the additional elements of carbon and/or hydrogen. When using these preferred sulfur-bearing compounds containing carbon and hydrogen, it is generally preferred that they contain no greater than 20 carbon atoms, with those containing less than 10 carbon atoms being preferred.

It is, of course, not necessary that the modifying agent be limited to a compound which will form only one of the above-mentioned hydrogen halides or hydrogen sulfide. It is within the scope of the present invention that a combination of the two types of compounds may be used. For example, the present invention contemplates the use in combination as a modifying agent such compounds as bromo propane and benzyl mercaptan. Also, one compound may contain both a halogen atom and a sulfur atom and may suffice as a combination modifying agent. Such a compound is 2-bromothiophene.

The amount of modifying agent necessary in carrying out the process of the present invention is such as to cause a molar concentration in the reaction mixture of no less than 0.01 mole percent of $H_2S$, HBr, HCl, HI, or combinations thereof. Seldom will the amount of the modifying agent in the reaction mixture exceed 50 mole percent. A preferred amount of modifying agent is that amount which will produce a concentration of $H_2S$, HBr, HCl, HI, or combinations thereof in admixture with the isobutylene within the range of 0.5 to 5.0 mole percent.

Temperatures at which the present invention is most often operated are within the range of 350 to 600° C. A preferred range of temperatures for operating the process of the present invention is 375 to 475° C. Generally, the pressures of the process of the present invention are in excess of 200 p.s.i.g., preferably within the range of from about 500 to about 10,000 p.s.i.g.

The residence time of the isobutylene within the reaction zone will usually be not less than 0.3 seconds, nor more than 60 minutes. A preferred residence time, however, is usually within the range of 0.5 to 30 minutes.

The method whereby the modifying agent and the isobutylene are brought into contact with one another is critical only to the extent that there should be a thorough, intimate contact between these components. Isobutylene and modifying agent may be concurrently introduced into a reaction zone which may be a batch container or a reaction chamber designed for continuous flow. If the process of the present invention is carried out as a continuous process, the isobutylene and modifying agent may be introduced into contact with one another by concurrent, crosscurrent or countercurrent flow. Further, either the isobutylene or the modifying agent may be passed through a stationary liquid column of the other or others to affect the necessary contact.

What is claimed is:
1. A thermal non-catalytic process for producing 2,5-dimethylhexene which comprises subjecting isobutylene in a reaction zone to a temperature of from about 350–600° C. and a pressure of at least 200 p.s.i.g. for a period of 0.005 to 60 minutes in the presence of at least 0.01 mole percent of a modifying agent consisting of $H_2S$.

2. The process of claim 1 wherein the amount of $H_2S$ in the reaction zone is within the range of 0.01 to 50 mole percent.

3. The process of claim 1 wherein the amount of $H_2S$ in the reaction zone is within the range of 0.5 to 5 mole percent.

4. The process of claim 1 wherein the temperature in the reaction zone is within the range of 375 to 475° C.

5. The process of claim 1 wherein the pressure in the reaction zone is within the range of 500 to 10,000 p.s.i.g.

References Cited

UNITED STATES PATENTS

| | | | |
|---|---|---|---|
| 2,156,718 | 5/1939 | Bent et al. | 260—683.15 |
| 2,486,441 | 11/1949 | Seger et al. | 260—683.15 |
| 2,616,934 | 11/1952 | Pines et al. | 260—683.15 |
| 3,305,598 | 2/1967 | Franz et al. | 260—683.1 |

PAUL M. COUGHLAN, JR., Primary Examiner

U.S. Cl. X.R.
260—683.15